(12) United States Patent
Zhang et al.

(10) Patent No.: US 9,983,350 B2
(45) Date of Patent: May 29, 2018

(54) BACKLIGHT MODULE AND LIQUID CRYSTAL DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Caizheng Zhang, Beijing (CN); Jingshi Li, Beijing (CN); Hyungkyu Kim, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 306 days.

(21) Appl. No.: 14/386,969
(22) PCT Filed: Oct. 25, 2013
(86) PCT No.: PCT/CN2013/085974
§ 371 (c)(1),
(2) Date: Sep. 22, 2014
(87) PCT Pub. No.: WO2014/190663
PCT Pub. Date: Dec. 4, 2014

(65) Prior Publication Data
US 2016/0187557 A1 Jun. 30, 2016

(30) Foreign Application Priority Data
May 30, 2013 (CN) .......................... 2013 1 0209913

(51) Int. Cl.
F21V 7/04 (2006.01)
F21V 8/00 (2006.01)
G02F 1/1333 (2006.01)

(52) U.S. Cl.
CPC ........... *G02B 6/009* (2013.01); *G02B 6/0055* (2013.01); *G02B 6/0088* (2013.01);
(Continued)

(58) Field of Classification Search
CPC .... G02B 6/009; G02B 6/0055; G02B 6/0088; G02B 6/0091
(Continued)

(56) References Cited

U.S. PATENT DOCUMENTS 7,742,121 B2 * 6/2010 Mori .................... G02B 6/0021
349/58
2006/0002146 A1 1/2006 Baba
(Continued)

FOREIGN PATENT DOCUMENTS

CN 1716042 A 1/2006
CN 1892360 A 1/2007
(Continued)

OTHER PUBLICATIONS

International Preliminary Report on Patentability dated Dec. 1, 2015; PCT/CN2013/085974.
(Continued)

Primary Examiner — Elmito Breval
Assistant Examiner — Meghan Ulanday
(74) Attorney, Agent, or Firm — Ladas & Parry LLP

(57) ABSTRACT

A backlight module and a liquid crystal display device, the backlight module comprises a back plate (101) and a fixing frame (102) firmly connected with the back plate (101), and further comprises a light guide plate (106); the fixing frame (102) is provided with a protrusion (111) extending towards an inner side of the backlight module, the light guide plate (106) extends into a region under the protrusion (111) of the fixing frame (102) and is pressed by the protrusion (111); the light guide plate (106) is provided with a lamp fixing hole (112) configured to fix a lamp. A liquid crystal display device comprising the backlight module is further disclosed.

7 Claims, 4 Drawing Sheets

(52) U.S. Cl.
CPC ..... *G02B 6/0091* (2013.01); *G02F 1/133308* (2013.01); *G02F 2001/133314* (2013.01); *G02F 2001/133317* (2013.01); *G02F 2201/503* (2013.01)

(58) Field of Classification Search
USPC ........................................................ 362/606
See application file for complete search history.

(56) References Cited

U.S. PATENT DOCUMENTS

| | | |
|---|---|---|
| 2007/0008451 A1 | 1/2007 | Tanaka |
| 2008/0089061 A1 | 4/2008 | Hsieh et al. |
| 2010/0277670 A1 | 11/2010 | Hamada |
| 2012/0194760 A1 | 8/2012 | Fukuda |

FOREIGN PATENT DOCUMENTS

| | | |
|---|---|---|
| CN | 101932871 A | 12/2010 |
| CN | 102352979 A | 2/2012 |
| JP | 2007-334131 A | 12/2007 |

OTHER PUBLICATIONS

First Chinese Office Action dated Dec. 23, 2015; Appln. No. 201310209913.X.
International Search Report Appln. No. PCT/CN2013/085974; dated Feb. 27, 2014.
Second Chinese Office Action dated Apr. 25, 2016; Appln. No. 201310209913.X.
Third Chinese Office Action dated Aug. 8, 2016; Appln. No. 201310209913.X.

* cited by examiner

BACKLIGHT MODULE AND LIQUID CRYSTAL DISPLAY DEVICE

TECHNICAL FIELD

Embodiments of the present invention relate to a backlight module and a liquid crystal display device.

BACKGROUND

At present, in various flat display devices, liquid crystal displays (LCDs) have become the mainstream products, and a backlight module is a main component of an LCD.

In a backlight module as illustrated by FIG. 1, a light guide plate 106 is an important component in the backlight module, and the main function of the light guide plate is to transform the point light source emitting from lamp 105 to a planar light source with high evenness.

As illustrated by FIG. 2a, in order to guarantee the optical coupling of the lamp 105 and the light guide plate 106, in the beginning of design, it is required that the lamp 105 and the light guide plate 106 contact closely with each other. However, as illustrated by FIG. 2b, the lamp 105 and the light guide plate 106 generally have an unexpected interval therebetween, which causes a part of the optical energy to lose.

The interval between the lamp 105 and the light guide plate 106 determine the amount of the optical energy obtained by the light guide plate 106; through testing, the consequence as illustrated by FIG. 3a and FIG. 3b can be obtained; FIG. 3a illustrates the irradiation consequence when the interval between the lamp 105 and the light guide plate 106 is 0 mm, FIG. 3b illustrates the irradiation consequence when the interval between the lamp 105 and the light guide plate 106 is 0.7 mm; it can be clearly seen from FIG. 3a and FIG. 3b that: the energy obtained by the light guide plate in FIG. 3a is higher than the energy obtained by the light guide plate in FIG. 3b. Analyzing in combination with specific data can obtain the consequence as illustrated by Table 1:

|  | Interval between the lamp and the light guide plate | | | | | |
| --- | --- | --- | --- | --- | --- | --- |
|  | 0 | 0.14 | 0.28 | 0.42 | 0.56 | 0.7 |
| Optical energy obtained by the light guide plate | 100% | 98.54% | 94.53% | 88.7% | 84.69% | 79.5% |

Table 1

As seen from the above, it is very important to guarantee the interval between the lamp 105 and the light guide plate 106 is 0.

Besides, in order to guarantee the optical coupling of the lamp 105 and the light guide plate 106, in design it is required that the center of the light emitting surface of the lamp 105 is corresponding to the center of the light guide plate 106, as illustrated by FIG. 4a. However, in the procedure of assembling and reliability testing, it is frequent to occur that the center of the light emitting surface of the lamp 105 does not correspond to the center of light guide plate 106, as illustrated by FIG. 4b, which causes the occurrence of the phenomenon of angle light leakage and bright spot in the procedure of reliability testing.

In order to guarantee that the center of the light emitting surface of the lamp 105 corresponds to the center of the light guide plate 106 and the stability between the lamp 105 and the light guide plate 106, so as to improve the optical stability of the backlight module, it is needed to add a lamp-light guide plate fixing tape 107 and a lamp-back plate fixing tape 108, which causes the increase of cost, and the improvement of simple tape design to the stability is limited.

Furthermore, because the glass substrate in the panel 104 has a different shrinkage ratio from the polarizer sheet and due to the reasons such as the gradual release of the stress generated in an attaching process during high thermal testing, the defections such as warp of the panel 104 as illustrated in FIG. 5, and bright spot and angle light leakage caused by the separation of the panel 104 from the backlight module are easy to occur. At present, with regard to the defections, the conventionally used solutions include improving the stickiness of the curtain tape 103, however, because the limited stickiness of the curtain tape 103 and possible liquidation of the curtain tape 103 caused in the procedure of improving the stickiness of the curtain tape 103, which causes the phenomenon such as the wire-drawing in the procedure of assembling and the pollution of the curtain tape 103 on the effective display region during reliability testing, thus the effect to alleviate the defections by improving the stickiness of the curtain tape 103 is small.

SUMMARY

Embodiments of the present invention provide a backlight module and a liquid crystal display device, so as to improve the brightness of the backlight module.

According to an embodiment of the present invention, a backlight module, comprises a back plate and a fixing frame firmly connected with the back plate, and further comprises a light guide plate; the fixing frame is provided with a protrusion extending towards the inner side of the backlight module, the light guide plate extends into a region under the protrusion of the fixing frame and is pressed by the protrusion; the light guide plate is provided with a lamp fixing hole configured to fix the lamp thereon.

Optionally, the protrusion directs to the film material in the backlight module.

Optionally, the lamp comprises LED luminous members, and further comprises a lamp fixing strip configured to be pressed by the light guide plate.

Optionally, a light emitting surface of the lamp closely contacts a light incident surface of the light guide plate.

Optionally, the lamp fixing hole and the lamp have a same size.

Optionally, the protrusion is provided with a curtain tape used to fix the panel thereon.

Optionally, the light guide plate and the back plate are provided with a reflective plate therebetween.

According to an embodiment of the present invention, a liquid crystal display device comprises the above backlight module.

DESCRIPTION OF DRAWING MARKS 101, back plate; 102, fixing frame; 103, curtain tape; 104, panel; 105, lamp; 106, light guide plate; 107, lamp-light guide plate fixing tape; 108, lamp-back plate fixing tape; 109, film material; 110, reflective plate; 111, protrusion; 112, lamp fixing hole; 113, lamp fixing strip; 114, grab; 200, backlight module.

DETAILED DESCRIPTION

In order to solve the above problems, an embodiment of the present invention provides a backlight module, which comprises a fixing frame connected with a back plate, and further comprises a light guide plate; the fixing frame is provided with a protrusion extending towards the inner side of the backlight module, the light guide plate extends into a region under the protrusion of the fixing frame and is pressed by the protrusion; the light guide plate is provided with a lamp fixing hole used to fix the lamp.

The inner side of the backlight module is described with regard to the main body of the fixing frame, the extending direction of the protrusion refers to the direction where the light guide plate and the optical film layer are located, so as to facilitate fixing of the light guide plate. Typically, the fixing frame is a rubber frame.

Figure 1:
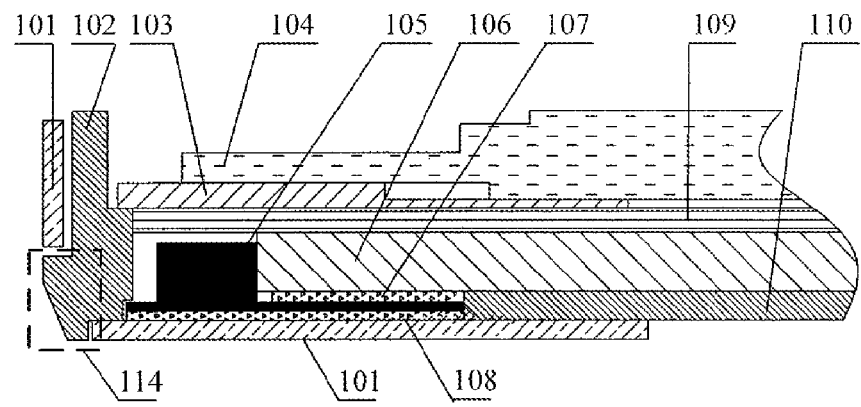
FIG. 1 is a structural diagram of an existing backlight module.
Figure 2A:
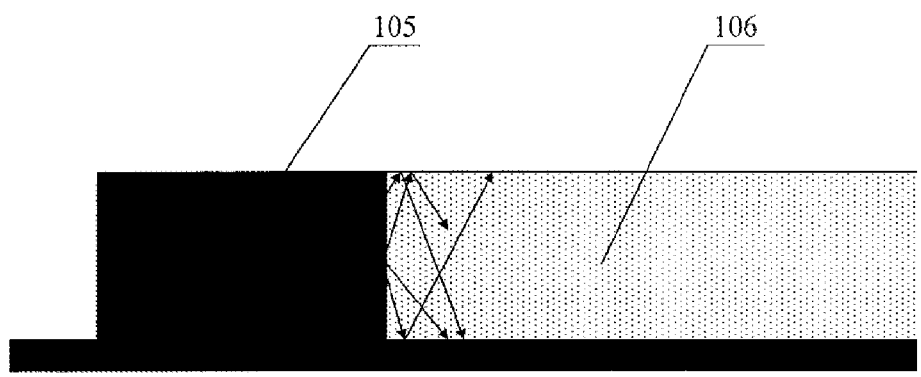
FIG. 2a and FIG. 2b are comparison schematic diagrams of the assembling status of a lamp and a light guide plate.
Figure 2B:
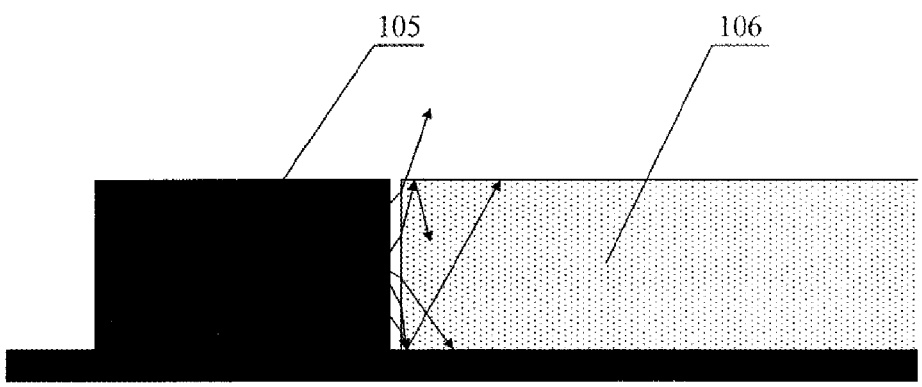
Figure 3A:
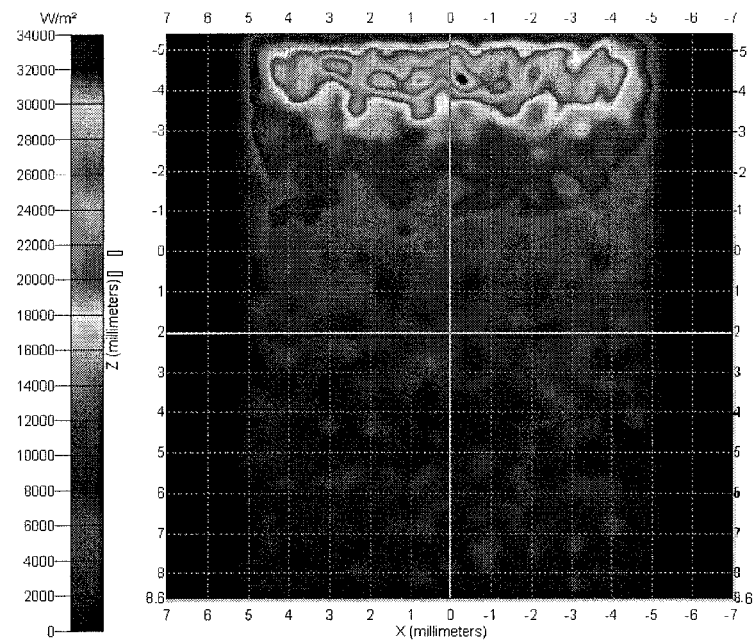
FIG. 3a and FIG. 3b are irradiation schematic diagrams of intervals between the lamp and the light guide plate.
Figure 3B:
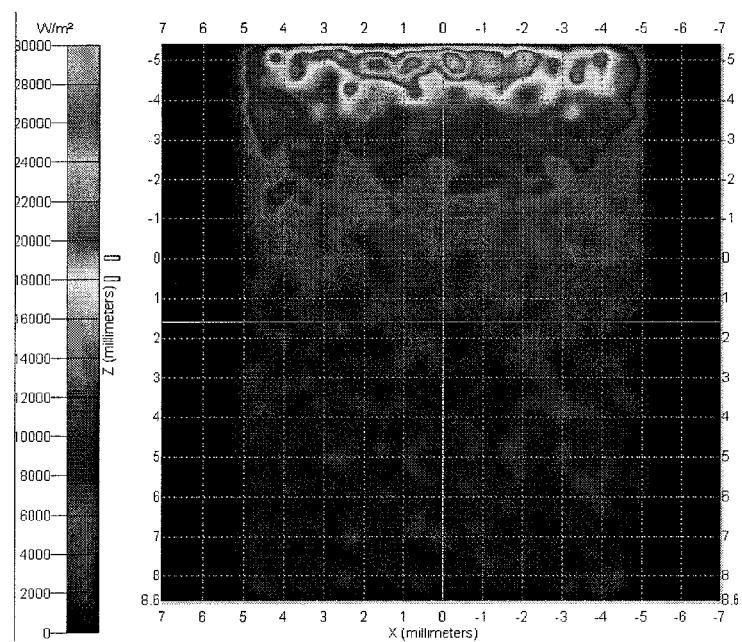
Figure 4A:
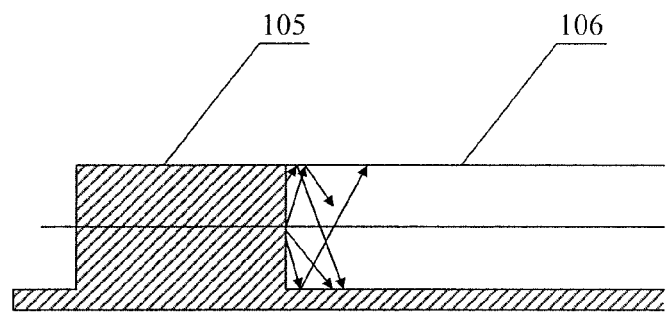
FIG. 4a and FIG. 4b are analog schematic diagrams of longitudinal deflective light between the lamp and the light guide plate.
Figure 4B:
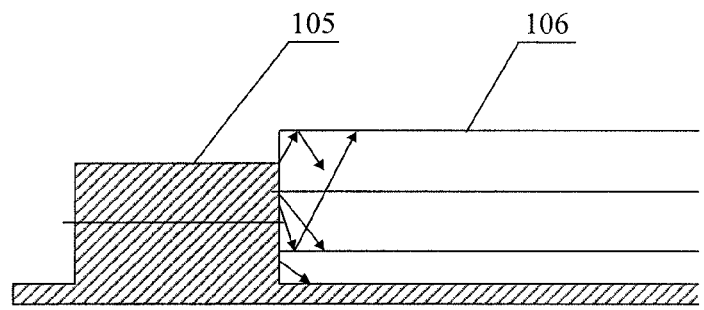
Figure 5:
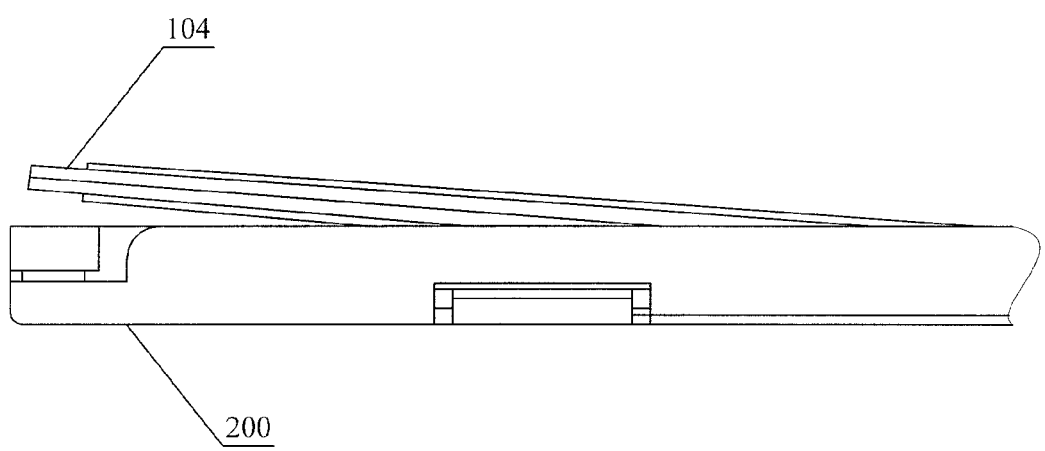
FIG. 5 is a schematic diagram showing that the panel is separated from the backlight module because of warp.
Figure 6:
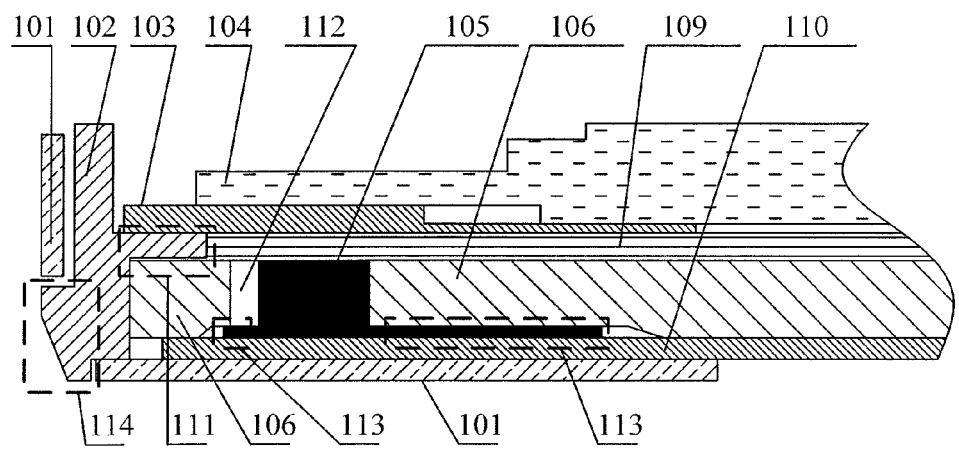
FIG. 6 is a structural diagram of a backlight module according to an embodiment of the present invention.
Figure 7:
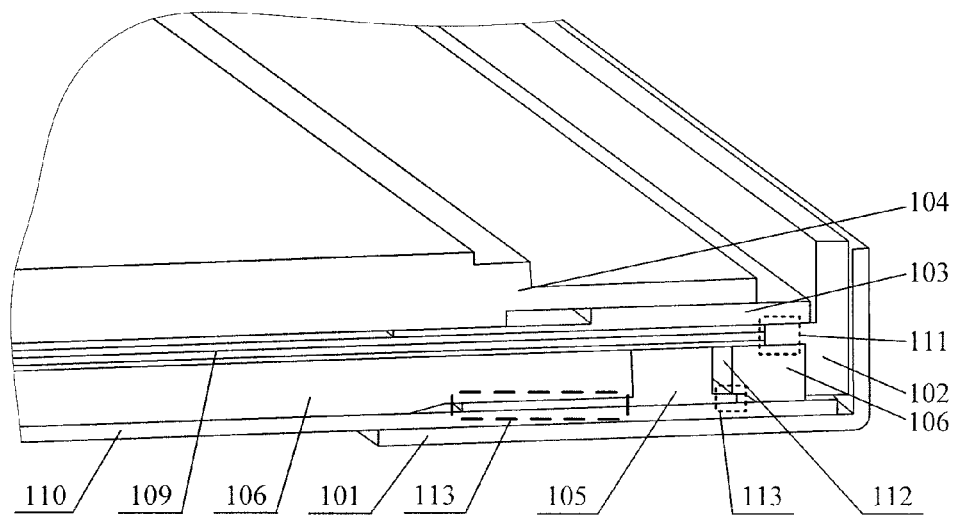
FIG. 7 is an elevation view of the backlight module in FIG. 6.

Combining FIG. 6 and FIG. 7, it is seen that, in the backlight module of the embodiment of the present invention, the fixing frame 102 is provided with a protrusion 111 extending towards the inner side of the backlight module, the protrusion 111 generally directs to a film material 109 in the backlight module, i.e., as illustrated in the drawing, the right side surface of the protrusion 111 is right opposite to the left side surface of the film material 109, because the film material 109 is generally disposed on the light guide plate 106 to function for further scattering light and enhancing light, the protrusion 111 is disposed at the position of the side surface of the film material 109, so as to facilitate the protrusion 111 to fix the light guide plate. Because, in the present embodiment, the fixing frame 102 is no longer used to press the lamp 105, and instead the light guide plate 106 directly braces the fixing frame 102, and the light guide plate 106 extends into a region under the protrusion 111 of the fixing frame 102, the light guide plate 106 is pressed by the protrusion 111 of the fixing frame 102, so that the fixing frame 102 can be made firmly fix the light guide plate 106 and improve the mechanical robustness of the backlight module. In this situation, the existing lamp-light guide plate fixing tape 107 and lamp-back plate fixing tape 108 are not required any more, reducing the costs of the backlight module.

For example, the lamp comprises LED luminous members, and further comprises a lamp fixing strip used to be pressed by the light guide plate. The LED luminous members are distributed along the side edge of the light guide plate in the same interval. Because the LED luminous members have the advantages of high brightness, small volume, and small heat generation, when being used in a backlight module, the LED luminous members can improve the light emitting efficiency of the backlight module. The lamp fixing strip may be a printing circuit board connected with the LED luminous members. The lamp fixing strip extends into a region of the light guide plate, because the light guide plate is pressed by the protrusion of the fixing frame, the lamp fixing strip is pressed by the light guide plate, so that the mechanical performance can be improved.

The light guide plate 106 is provide with a lamp fixing hole 112 therein, the lamp 105 is disposed in the lamp fixing hole 112. The light guide plate 106 presses the lamp fixing strip 113 of the lamp 105, so as to make the light guide plate 106 able to firmly fix the lamp 105. Generally, the light emitting surface of the lamp 105 closely fitted with the light guide plate 106; in this way, the interval occurred between the lamp 105 and the light guide plate 106 because of shock or reliability testing etc. can be avoided, and the center of the light emitting surface of the lamp 105 and the center of the light guide plate 106 are caused to be in a same line, so that the backlight brightness and the optical stability are improved. The center of the light emitting surface of the lamp 105 and the center of the light guide plate 106 being in a same line means that, as illustrated in the diagram, the center of the light emitting surface of the lamp 105 right corresponds to the center of the light incident surface of the light guide plate 106, and extends into the light guide plate along a straight line.

In a practical application, it is better to guarantee the lamp fixing hole 112 and the lamp 105 have the same size to make the lamp 105 locked in the lamp fixing hole 112, so as to improve the mechanical performance, backlight brightness and optical stability.

It can be seen from FIG. 6 and FIG. 7 that, because the fixing frame 102 is provided with a protrusion 111 extending towards the inner side of the backlight module, the adhesive area between the fixing frame 102 and the curtain tape 103 obviously increases, so that the adhesive intensity between the backlight module and the panel 104 is improved and the mechanical performance of the backlight module is improved in the situation that the stickiness of the curtain tape 103 is maintained constant, and the problems in the existing technology such as warp of the panel 104 will not occur again.

When the backlight module is assembled, the lamp 105 may be disposed in the lamp fixing hole 112 first, then the lamp 105 and the light guide plate 106 are aligned and disposed in the back plate 101 that has been assembled with the reflective plate 110, then the fixing frame 102 is disposed directly on the light guide plate 106 and the grab 114 of the fixing frame 102 is locked with the back plate 101, and the protrusion 111 of the fixing frame 102 presses the light guide plate 106 at the same time to fix the light guide plate 106; at this time, the lamp 106 is pressed by the light guide plate 106.

The above backlight module may be mounted within a liquid crystal display device, and the liquid crystal display device comprises a liquid crystal panel and the above mentioned backlight module, because the backlight module have the above advantages, which makes the liquid crystal display device have a better performance.

To sum up, it can be understood that the backlight module and the liquid crystal display device comprising the backlight module of the embodiments of the present invention efficiently improve the coupling between the light guide plate and the lamp, guarantee the alignment precision of the lamp and the light guide plate, remove the defection of bright spot, and improve the backlight brightness and the mechanical stability of the backlight module, and also efficiently remove the defections such as angle light leakage caused by panel warp that frequently appears during the procedure of reliability testing.

The above descriptions are only preferable embodiments of the present invention, not limitative of the protection scope of the present invention.

The invention claimed is:

1. A backlight module, comprising: a back plate and a fixing frame firmly connected with the back plate, and further comprising: a light guide plate; wherein the fixing frame is provided with a protrusion extending towards an inner side of the backlight module, the light guide plate extends into a region under the protrusion and is pressed by the protrusion; the light guide plate is provided with a lamp fixing hole configured to fix a lamp; wherein the lamp comprises LED luminous members, and wherein the lamp further comprises a lamp fixing strip configured to be connected with the LED luminous members, and pressed directly by the light guide plate.

2. The backlight module according to claim 1, wherein the protrusion directs to a film material in the backlight module.

3. The backlight module according to claim 1, wherein a light emitting surface of the lamp closely contacts with a light incident surface of the light guide plate.

4. The backlight module according to claim 1, wherein the lamp fixing hole and the lamp have a same size.

5. The backlight module according to claim 1, wherein the protrusion is provided with a curtain tape configured to fix a panel.

6. The backlight module according to claim 1, wherein a reflective plate is provided between the light guide plate and the back plate.

7. A liquid crystal display device, comprising: the backlight module as claimed by claim 1.

* * * * *